3,597,271
METHOD OF PRODUCING AIR STABLE ALKALINE-EARTH METAL OXIDE WHILE AVOIDING EUTECTIC MELTING

John M. Cawley, Oakhurst, Robert G. Young, Nutley, and Albert W. Wainio, Livingston, N.J., assignors to Westinghouse Electric Corporation, Pittsburgh, Pa.
No Drawing. Filed July 9, 1969, Ser. No. 840,453
Int. Cl. B44d 1/02; C23c; C23d
U.S. Cl. 117—224      7 Claims

ABSTRACT OF THE DISCLOSURE

The method of producing air stabilized alkaline-earth metal oxide emission material by means of a two-step heating process of mixed alkaline-earth metal carbonate, by which the eutectic melting stage of the carbonate-oxide mixture is avoided. Alkaline-earth metal carbonate is heated to a temperature which is below the eutectic melting temperature for alkaline-earth carbonate-oxide mixtures. The heating is continued until all of the alkaline-earth metal carbonate is converted to alkaline earth metal oxide. The alkaline-earth metal oxide is then heated from about 1300° C. to about 1750° C. for a predetermined time to render the oxide air stable.

BACKGROUND OF THE INVENTION

Alkaline-earth metal oxides are the most commonly employed emission materials used as a coating on fluorescent lamp electrodes. Normally, the electrodes are first coated with alkaline-earth metal carbonates, which are then converted to the oxides by heating the electrodes to 1400° C. or higher in the evacuated lamp. This thermal decomposition of the carbonates produces carbon dioxide gas which must be pumped from the lamp. The carbon dioxide is known to have a deleterious effect on fluorescent lamp phosphors. It would be desirable to coat the electrodes directly with the oxides, but normally the oxides are very reactive and combine chemically with water and carbon dioxide present in the air surrounding the electrodes prior to the evacuation process during lamp manufacture. The water, which combines with the oxides to form alkaline-earth metal hydroxides, is very difficult to remove completely by thermal decomposition. It is desirable, therefore, to have an oxide in such state that it is stabilized, meaning that it will resist chemical reaction with water or carbon dioxide in the surrounding air.

A method of stabilizing the alkaline-earth metal oxides is described in copending application Ser. No. 618,021 filed Feb. 23, 1967, and owned by the present assignee. The method described in the aforementioned application consists in heating the mixed alkaline-earth metal carbonate to a temperature of from 1300° C. to 1750° C., for a period sufficient to convert the alkaline-earth metal carbonate to an air stable oxide. It has been discovered that during the conversion of the mixed alkaline-earth metal carbonate to oxide there exists a eutectic melting stage which is reached at temperatures greater than 1250° C. A portion of this mixture of carbonate, and oxide will melt at this eutectic melting temperature and the material will flow making it difficult to contain. The liquified mixture tends to react with the container and in general can result in wastage of material as well as being inconvenient to handle. In the literature, the eutectic melting of $BaCO_3$–$BaO$ has been reported at various values, from 900° C. to 1030° C. In practicing the present method with the triple carbonate wherein the $BaCO_3$ content is not greater than about 90% by weight there is no observed eutectic melting at temperatures below 1200° C. The production of air stable barium oxide from the carbonate is also described in U.S. Pat. 2,806,970, issued Sept. 17, 1957.

SUMMARY OF THE INVENTION

It is an object of this invention to provide a convenient method for converting alkaline-earth metal carbonate to the oxide and air stabilizing the same.

It is another object to provide a method for air stabilizing alkaline-earth metal oxide emission material, which avoids the eutectic melting stage which exists between mixtures of the carbonate and the oxide.

The aforementioned objects and others which will become apparent as the description proceeds are accomplished by the method comprising preparing a mass of mixed alkaline-earth metal carbonate, which is first heated for a predetermined time at a temperature sufficient to convert the mixed carbonate to the mixed oxide in an atmosphere comprising oxygen or hydrogen or in inert atmosphere. The greater the mass of material and the lower the temperature utilized, the longer the heating time required. This heating converts the alkaline-earth metal carbonate to alkaline-earth metal oxide. The heating temperature is below the eutectic melting temperature for the carbonate-oxide mixture which exists during the conversion process. The converted alkaline-earth metal oxide is further heated to from about 1300° C. to about 1750° C. for a period sufficient to render the oxide air stable.

DESCRIPTION OF THE PREFERRED EMBODIMENT

As an example of the present invention a mixture is prepared of 800 grams of barium carbonate, 100 grams of calcium carbonate, and 100 grams of strontium carbonate. This mass or mixture of material is mechanical mixed to a uniform consistency. The mass of mixed carbonate is placed in a suitably refractory crucible, of for example platinum or tantalum, which crucible is placed in a controlled atmosphere furnace. The mixed carbonate is then heated to about 1100° C. for about four hours, in an atmosphere comprising oxygen, for example an air atmosphere. The mixed alkaline-earth metal carbonate will be converted to mixed alkaline-earth metal oxide. The heating temperature is well below the eutectic melting temperature for any carbonate-oxide mixture of the triple carbonate-oxide which will be present during the conversion process. This first heating is preferably carried out at a temperature of from 800° C. to below 1200° C. for a period sufficient to convert substantially all of the mixed carbonate to the oxide. This first heating time for large batch preparations is preferably at least one-half hour at the higher temperature to insure conversion of the mixed carbonate to the oxide. When the material has been converted to the oxide, it is then heated to a much higher temperature, for example 1500° C. for about one hour to render the alkaline-earth metal oxide air stable. The stabilized alkaline-earth metal oxide after cooling, may be ground to a finely divided state to which a binder, such as polymethylmethacrylate or cellulose acetate is added. The mixture is then coated onto the desired refractory metal substrate, typically a coiled-coil tungsten filament used as a fluorescent lamp electrode. The binder is easily volatilized and removed by a heating step which can be carried out at about 400° C., either before the electrode is mounted for example in a fluorescent lamp, or after it has been sealed into the lamp.

It has been discovered that by following the method described above a very large percentage of the alkaline earth metal carbonate will be successfully converted to an alkaline earth metal oxide which is readily usable as an emission material. This is because the double-firing step at the specified temperatures avoids eutectic melting of the emission material which has heretofore limited the production of readily usable air stable emission material, since when the melted material contacted the firing crucible, it reacted therewith. It has also been found desirable when practicing the method of the invention to press the triple carbonate mixture into a self-sustaining compact to thus minimize the surface contact of the mixture with the crucible.

In the foregoing example, a specific mixture of alkaline-earth metal was given, but the method can be practiced utilizing a broad range of alkaline-earth metal mixtures. The barium carbonate should be present in an amount of from 40 to 90% by weight of the emission material, strontium carbonate in an amount of from 5 to 50% by weight, and calcium carbonate in an amount of 5 to 30% by weight. Coprecipitate triple carbonates have also been successfully utilized. An atmosphere comprising oxygen was described as the heating atmosphere in the foregoing description, however a hydrogen atmosphere can also be used. The heating temperatures can be widely varied with the initial conversion of a carbonate to the oxide being carried out at a temperature of from about 800° C. to below 1200° C. The heating of the oxide material to render it air stable can be carried out in a range of from about 1300° C. to about 1750° C. The aforementioned copending application Ser. No. 618,021 teaches the addition of amounts of selected refractory metal oxides to the alkaline earth metal oxide emission material. Such oxides of the metals zirconium, aluminum, tantalum, tungsten, thorium, and hafnium can also be utilized as additives in practicing the present invention. As an example, about 5 grams of very finely divided aluminum oxide having an average particle size of about 0.05 micron can be added to the 1 kilogram mixture of triple carbonates described in the foregoing example. The use of the very finely divided aluminum oxide has permitted the reduction in the preferred weight percent of aluminum oxide compared to the mixed carbonate.

In another embodiment of the present invention, after initially heating the mixed carboante at 1100° C. to produce alkaline-earth metal oxide, the oxide is ground and has added thereto a suitable readily volatilizable binder. This mixture is coated onto a refractory metal substrate, for example a tungsten coil. The coated coil is then fired in an atmosphere of hydrogen at about 1400° C. for 45 minutes, to thereby render the alkaline-earth metal oxide air stable, and also to provide a very adherent electron-emissive coating on the tungsten support.

In yet another embodiment, a small amount of the mixture of alkaline-earth metal carbonates is coated onto a refractory metal substrate, for example a tungsten coil using a suitable binder, and this coated coil is heated to about 1100° C. for 1 hour in a hydrogen atmosphere. The carbonate is thereby reduced to the oxide and a highly adherent coating is formed on the coil. The oxide coated coil is then heated to about 1500° C. to render the material air stable.

In these embodiments where the carbonate or oxide is rendered air stable directly on the refractory metal substrate, the most commonly used metals as is known in the prior art are tungsten, molybdenum, and alloys of these metals.

The carbonate can be converted to the oxide in an atmosphere comprising oxygen, such as air, or in an atmosphere comprising hydrogen, or in an inert atmosphere. When the carbonate or the non-stabilized oxide is stabilized by heating while coated directly on a refractory metal substrate it is preferable to use an atmosphere comprising hydrogen to prevent reaction of the oxide with the refractory metal.

In each of the embodiments described the eutectic melting stage has been avoided by first firing the alkaline-earth metal carbonates at a temperature below the eutectic melting temperature. Only after the carbonates have been converted to a mixture of alkaline-earth metal oxides is the material fired at a temperature sufficient to render the oxide air stable.

In summary, a method has been provided for producing air stable emission material in large quantities, and with a very high yield of alkaline-earth metal oxide emission material. The production process has been made more convenient and efficient. The use of this stabilized emission material greatly simplifies the evacuation procedure during the manufacture of fluorescent lamps, in that time consuming treating and bake out operations are eliminated or at least substantially reduced in time. In utilizing an embodiment of the present method one can coat approximately twice the amount of alkaline-earth metal oxide emission material onto a standard coil than was possible utilizing prior art methods since such prior art methods first coated the substrate with carbonate. This increase of emission material will allow considerably longe lifetime in fluorescent lamps. The use of the air stable alkaline-earth metal oxide emission material prevents evolution of carbon dioxide in fluorescent lamps, which is known to be deleterious to the phosphor material. While the method of the present invention has been described by way of specific example, it is not to be limited thereto or thereby.

We claim as our invention:

1. Method of producing air stabilized alkaline-earth metal oxide emission material, which method comprises;
    (a) preparing a mass substantially comprising mixed alkaline-earth metal carbonate;
    (b) first heating said mass of mixed alkaline-earth metal carbonate for a predetermined time and at a predetermined temperature, which time and temperature are sufficient to convert said carbonate to the oxide while avoiding eutectic melting of the carbonate-oxide mixture which exists during said conversion; and
    (c) heating said converted mixed alkaline-earth metal oxide to from 1300° C. to about 1750° C. for a predetermined time to render said oxide substantially air stable.

2. The method as specified in claim 1, wherein said air stabilized mixed alkaline-earth metal oxide is ground and coated to a refractory metal substrate.

3. The method as specified in claim 1, wherein said mixed alkaline-earth metal carbonate substantially comprises from 40 to 90% by weight barium carbonate, 10 to 50% by weight strontium carbonate, and 5 to 30% by weight calcium carbonate.

4. The method as specified in claim 2, wherein predetermined amounts of selected refractory metal oxides are included in said coating.

5. The method as specified in claim 1, wherein after said mixed alkaline-earth metal carbonate is converted to the oxide, said oxide is ground and coated onto selected refractory metal substrate, and said oxide is heated to render it air stable.

6. The method as specified in claim 1, wherein said mixed alkaline-earth metal carbonate is initially coated onto a selected refractory metal substrate before being converted to said oxide.

7. The method as specified in claim 1, wherein said predetermined heating temperature is preferably from about 800° C. to 1200° C. for at least one-half hour, with the lower the temperature the longer the firing time.

References Cited

UNITED STATES PATENTS

| | | | |
|---|---|---|---|
| 2,806,970 | 9/1957 | Meister et al. | 252—507 |
| 2,917,415 | 12/1959 | Levi | 117—223 |

WILLIAM L. JARVIS, Primary Examiner

U.S. Cl. X.R.

117—223, 221; 23—186; 252—507, 509